(12) United States Patent
Couch et al.

(10) Patent No.: US 8,521,711 B2
(45) Date of Patent: Aug. 27, 2013

(54) PROVIDING PERSISTENT REFINED INTERMEDIATE RESULTS SELECTED FROM DYNAMIC ITERATIVE FILTERING

(75) Inventors: Tanya Couch, San Jose, CA (US); Farnaz Erfan, San Jose, CA (US); Thomas Friedrich, San Jose, CA (US); Daina Edvina Pupons Wickham, Morgan Hill, CA (US); Alexander Daniel Robinson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1130 days.

(21) Appl. No.: 11/611,135

(22) Filed: Dec. 15, 2006

(65) Prior Publication Data

US 2008/0147632 A1 Jun. 19, 2008

(51) Int. Cl.
*G06F 17/30* (2006.01)
(52) U.S. Cl.
USPC .......................................... 707/706; 707/728
(58) Field of Classification Search
USPC ................................................ 707/706, 728
See application file for complete search history.

(56) References Cited

U.S. PATENT DOCUMENTS

| | | | |
|---|---|---|---|
| 5,857,179 A | | 1/1999 | Vaithyanathan et al. |
| 6,041,331 A | | 3/2000 | Weiner et al. |
| 6,356,899 B1 | | 3/2002 | Chakrabarti et al. |
| 6,493,702 B1 | * | 12/2002 | Adar et al. ............... 707/706 |
| 6,516,312 B1 | * | 2/2003 | Kraft et al. ............... 707/610 |
| 6,636,848 B1 | * | 10/2003 | Aridor et al. ............. 707/728 |
| 2005/0114756 A1 | * | 5/2005 | Lehikoinen et al. ...... 715/501.1 |
| 2006/0010117 A1 | | 1/2006 | Bonabeau et al. |
| 2007/0192319 A1 | * | 8/2007 | Finley et al. ............. 707/7 |
| 2008/0005292 A1 | * | 1/2008 | Vinberg et al. ........... 709/223 |
| 2008/0120289 A1 | * | 5/2008 | Golan et al. ............. 707/5 |

OTHER PUBLICATIONS

Anick, PG. et al., "Exploiting Clustering and Phrases for Context-Based Information Retrieval," SIGIR'97, PA, USA, 1997, pp. 314-323.
Kobayashi, M. et al., "Information Retrieval on the Web," ACM Computing Surveys, vol. 32, No. 2, Jun. 2000.
Li, T., et al., "Document Clustering via Adaptive Subspace Iteration," SIGIR'04, Jul. 25-29, 2004, Sheffield,South Yorkshire, UK, pp. 218-225.

\* cited by examiner

*Primary Examiner* — Kim Nguyen
(74) *Attorney, Agent, or Firm* — Janaki K. Davda; Konrad, Raynes, Davda & Victor LLP

(57) ABSTRACT

A persistent filter refining system places a search result comprising objects in a dynamic non-persistent bucket and displays the search result in a dynamic non-persistent bucket display for selection of the objects by a user. The system transfers a selected object from the dynamic non-persistent bucket to a persistent bucket and displays the transferred selected object in a persistent bucket display. The system iteratively provides additional search results to the user for selection and transfer of additional selected objects to the persistent bucket to provide access by a user to take action on the transferred selected object and additional selected objects. In one embodiment, the present system displays one or more additional search results for comparison and selection of objects by the user.

9 Claims, 8 Drawing Sheets

PROVIDING PERSISTENT REFINED INTERMEDIATE RESULTS SELECTED FROM DYNAMIC ITERATIVE FILTERING

FIELD OF THE INVENTION

The present invention generally relates to performing searches on a collection of items such as in a database, in a corpus of documents, in a web-based retailer, etc. More particularly, the present invention pertains to generating a persistent list of items selected from non-persistent search results of one or more searches.

BACKGROUND OF THE INVENTION

Filters are ubiquitous in database and Internet applications. A user inputs search criteria to a filter and the filter returns results matching the search criteria. One conventional filter is non-iterative and typically comprises a complex user interface with numerous input fields requiring user-determined criteria. Another conventional filter is iterative; a user is able to "add on" to an existing list of returned results. Although conventional filtering technology has proven to be useful, it would be desirable to present additional improvements.

The non-iterative conventional filter requires the user to define search criteria with desired end results in mind, putting the burden of correctly identifying unknown objects on the user. The complex user interface typically comprises numerous criteria input fields in which the user has only one option to enter search criteria to reach the desired results. Forming such search criteria may be a difficult task since the desired objects searched for by the user may be unknown to the user.

If the filter does not return the objects desired by the user, the user may wish to refine the search. If so, the user is required to define new search criteria that overwrite the results that were reached with the previous search. In most cases, some of the results returned from the first trial are valuable to the user. This search becomes more difficult for the user if the given filter does not comprise all the fields required to define a desired criterion that may return desired results. An example of this search is a type of a Google® search, the results of each search are discarded when a new search is entered.

The iterative conventional filter allows a user to "add on" to an existing list of returned results. The objects from each iteration are appended to a search result list. However, not all the results returned from each iteration may be desirable to the user. In many cases, the search result list comprises results that the user does not desire and does not want to keep. The iterative conventional filter does not allow the user to refine the search result list. Consequently, after numerous iterations the appended search result list becomes a long list of objects of desired matches and undesired matches. The user is required to evaluate this long list of objects to identify desired objects.

What is therefore needed is a system, a computer program product, and an associated method for providing persistent refined results selected from dynamic iterative filtering. Such a system would maintain a persistent list of objects selected by a user from search results in an iterative fashion, allowing the user to form a list of desired objects from additional filters. The need for such a solution has heretofore remained unsatisfied.

SUMMARY OF THE INVENTION

The present invention satisfies this need, and presents a system, a computer program product, and an associated method (collectively referred to herein as "the system" or "the present system") for providing persistent refined results selected from dynamic iterative filtering.

The present system places a search result comprising a plurality of objects in a dynamic non-persistent bucket and displays the search result in a dynamic non-persistent bucket display for selection of the objects by a user. The present system further transfers a selected object from the dynamic non-persistent bucket to a persistent bucket and displays the transferred selected object in a persistent bucket display. The present system iteratively provides additional search results to the user for selection and transfer of additional selected objects to the persistent bucket to provide access by a user to take action on the transferred selected object and additional selected objects.

In one embodiment, the present system displays one or more additional search results for comparison and selection of objects by the user.

In another embodiment, transferring the selected object comprises providing a copy of the selected object to the persistent bucket. For Example, the user can copy objects from the search results to the persistent list.

In a further embodiment, transferring the selected object comprises removing the selected object from the dynamic non-persistent bucket and placing the selected object in the persistent bucket.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Non-persistent bucket: a non-persistent object comprising a collection of objects or items obtained in response to a search criteria and provided to a user for selection from among the objects or items in the collection.

Persistent bucket: a persistent object comprising a collection of objects or items selected by a user from a non-persistent bucket.

Figure 1:
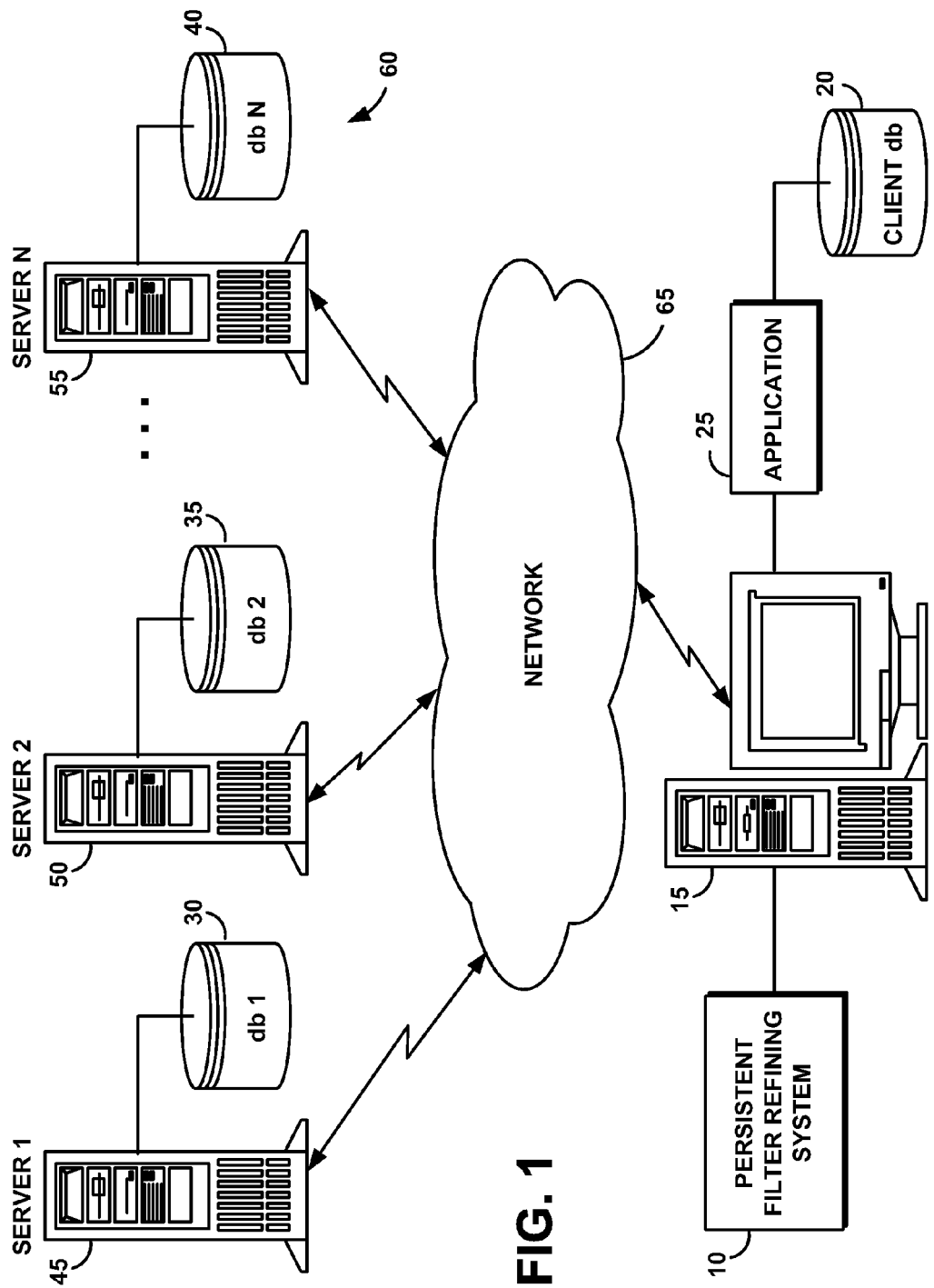
FIG. 1 is a schematic illustration of an exemplary operating environment in which a persistent filter refining system of the present invention can be used.

FIG. 1 portrays an exemplary overall environment in which a system, a service, a computer program product, and an associated method (the persistent filter refining system or the "system 10") for providing persistent refined intermediate results selected from dynamic iterative filtering according to the present invention may be used. System 10 comprises a software programming code or a computer program product that is typically embedded within, or installed on a user computer 15. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. The computer program product comprises the instructions that implement a method of system 10. For the purposes of this description, a computer-usable or computer readable medium can be any apparatus that can contain, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk—read only memory (CD-ROM), compact disk—read/write (CD-R/W) and DVD.

A data processing system suitable for storing and/or executing program code comprise at least one processor coupled directly or indirectly to memory elements through a system bus. The memory elements can include local memory employed during actual execution of the program code, non-volatile storage, permanent storage, or cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A user uses system 10 on the user computer 15 to search various repositories of data. Exemplary repositories of data that may be searched by system 10 comprise an application database (APP db) 20 of an application 25, a db 1, 30, a db 2, 35, through a db N, 40. A server 1, 45, hosts the database db 1, 30. A server 1, 50, hosts the database db 2, 35. A server N, 55, hosts the database db N, 40. The databases db 1, 30, db 2, 35, through db 3, 40, are collectively referenced as databases 60.

Databases 60 may be accessed locally or via a network 65, as illustrated by FIG. 1. Application 25 and APP db 20 may be accessed locally (as illustrated by FIG. 1) or remotely via a network such as network 65. While one application and associated database such as application 25 and APP db 20 are shown, additional applications and application databases may be accessed by system 10. Furthermore, while databases are used for illustration purposes only, any type of data repository that may be searched can be accessed by system 10.

Figure 2:
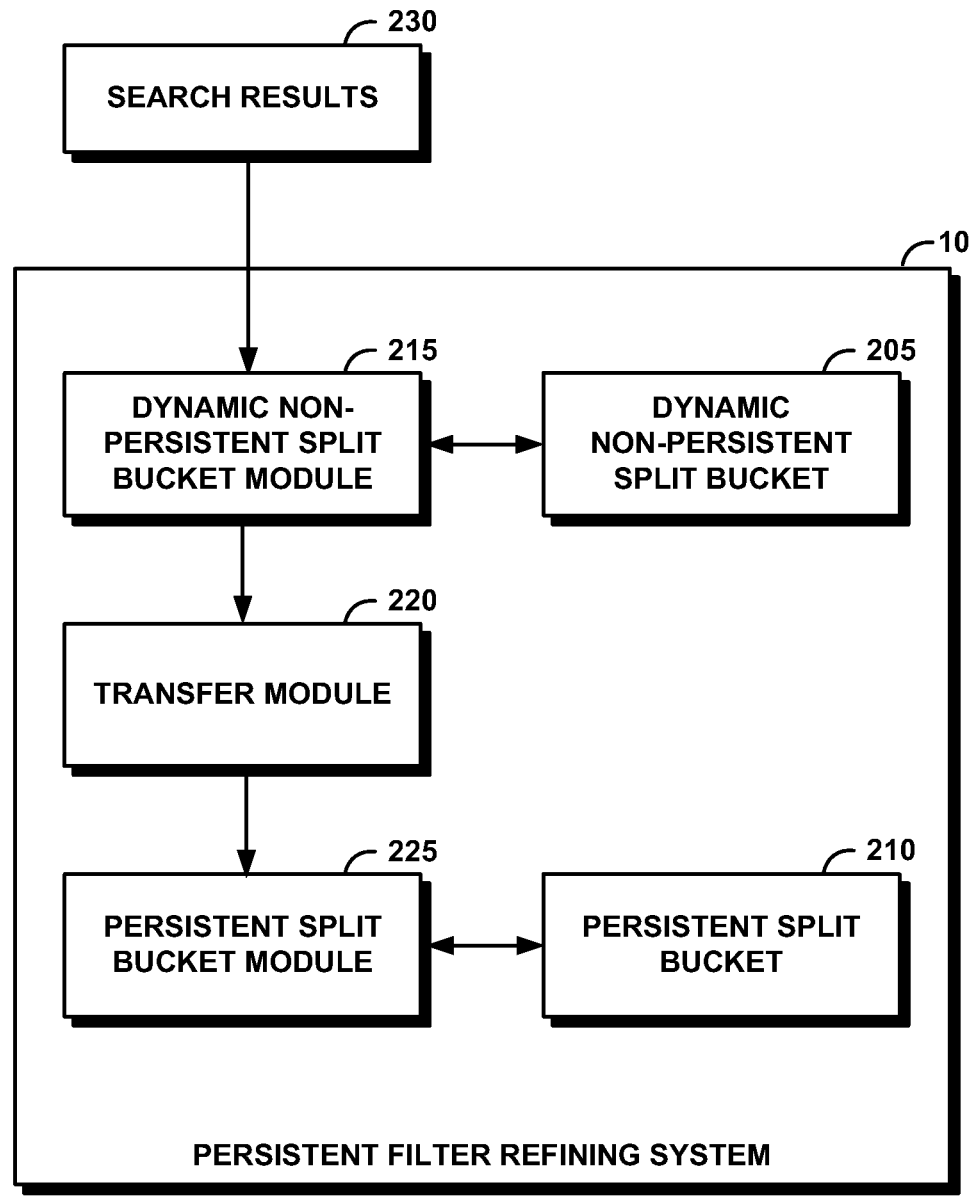
FIG. 2 is a block diagram of the high-level architecture of the persistent filter refining system of FIG. 1.

FIG. 2 illustrates a high-level hierarchy of system 10. System 10 comprises a dynamic non-persistent bucket 205, a persistent bucket 210, a dynamic non-persistent bucket module 215, a transfer module 220, and a persistent bucket module 215. The dynamic non-persistent bucket module 225 receives as input search results 230 and places the search results in the dynamic non-persistent bucket 205. Contents of the dynamic non-persistent bucket 205 are displayed to the user. The user selects objects or items from contents of the dynamic non-persistent bucket 205. The transfer module 220 transfers the selected objects or items from the dynamic non-persistent bucket module 215 to the persistent bucket module 225. The persistent bucket module 225 places the selected objects or items in the persistent bucket 210. Contents of the persistent bucket 210 are displayed to the user.

In one embodiment, the transfer module 220 copies the selected items or objects in the dynamic non-persistent bucket 205 and provides the copy to the persistent bucket module 225. In another embodiment, the transfer module 220 moves the selected items in the dynamic non-persistent bucket 205 to the persistent bucket module 225.

The user iteratively uses system 10 to reach search results desired by the user. Since the user can iteratively reach their desired results, the user is not required to define a precise criterion in one complex filter. The user is able to retain the result of each iteration in the persistent bucket 210 and add on to the retained results as the user iterates through filters. In further iterations, the user can refine the returned results of each iteration before moving to the next iteration.

Figure 3:
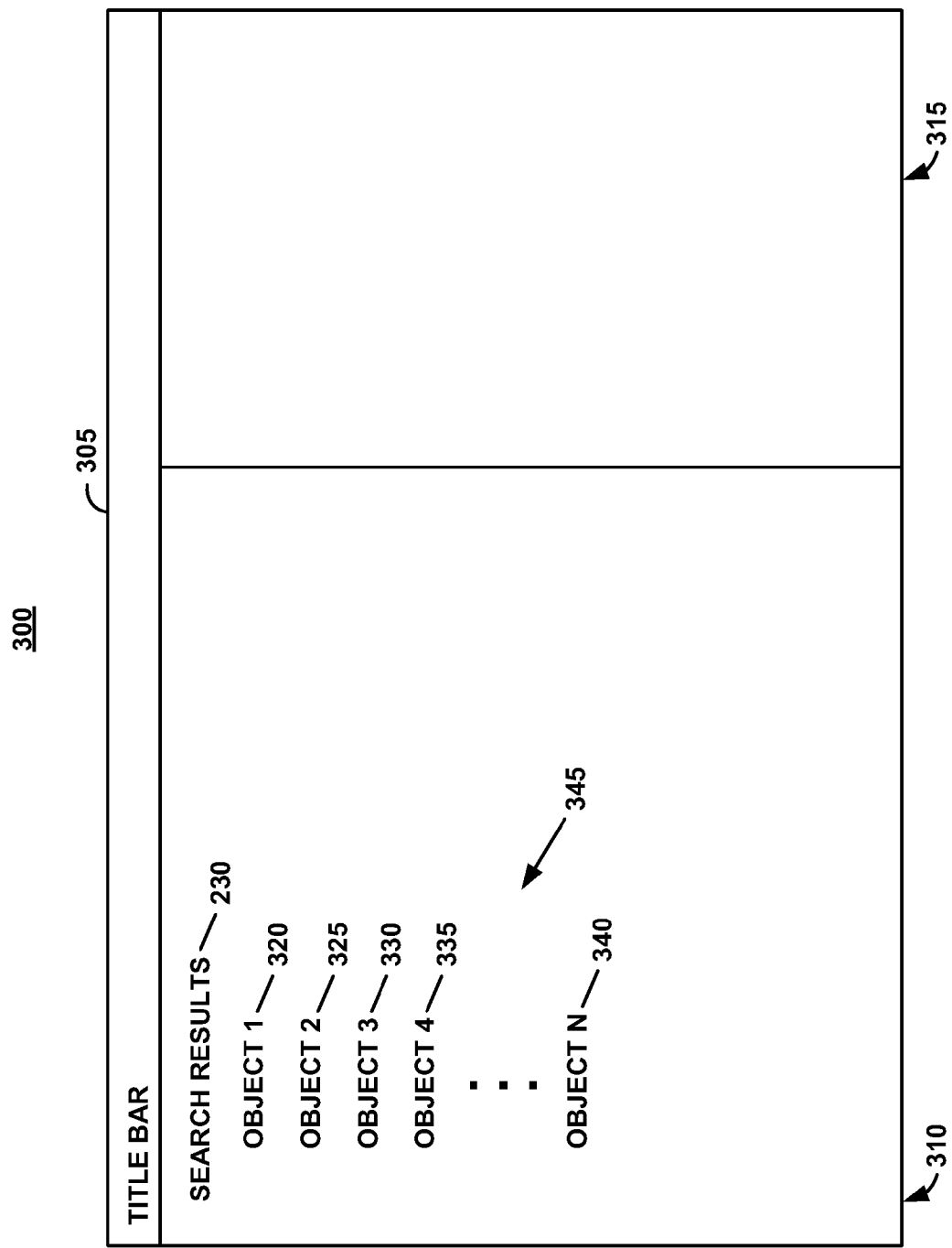
FIG. 3 is an exemplary screen shot of a search result returned to the persistent filter refining system of FIGS. 1 and 2 and placed in a dynamic non-persistent bucket.

FIG. 3 shows a screen shot 300 that illustrates use of system 10. The screen shot 300 illustrates a dual-purpose or multi-purpose "split" container. The screen shot 300 comprises a title bar 305, a dynamic non-persistent bucket display 310, and a persistent bucket display 315.

The dynamic non-persistent bucket display 310 displays search results 230. The search results 230 comprise, for example, an object 1, 320, an object 2, 325, an object 3, 330, an object 4, 335, through an object N, 340, collectively referenced as objects 345. A scroll bar may be provided to access to objects 345 that are not visible in the dynamic non-persistent bucket display 310.

Figure 4:
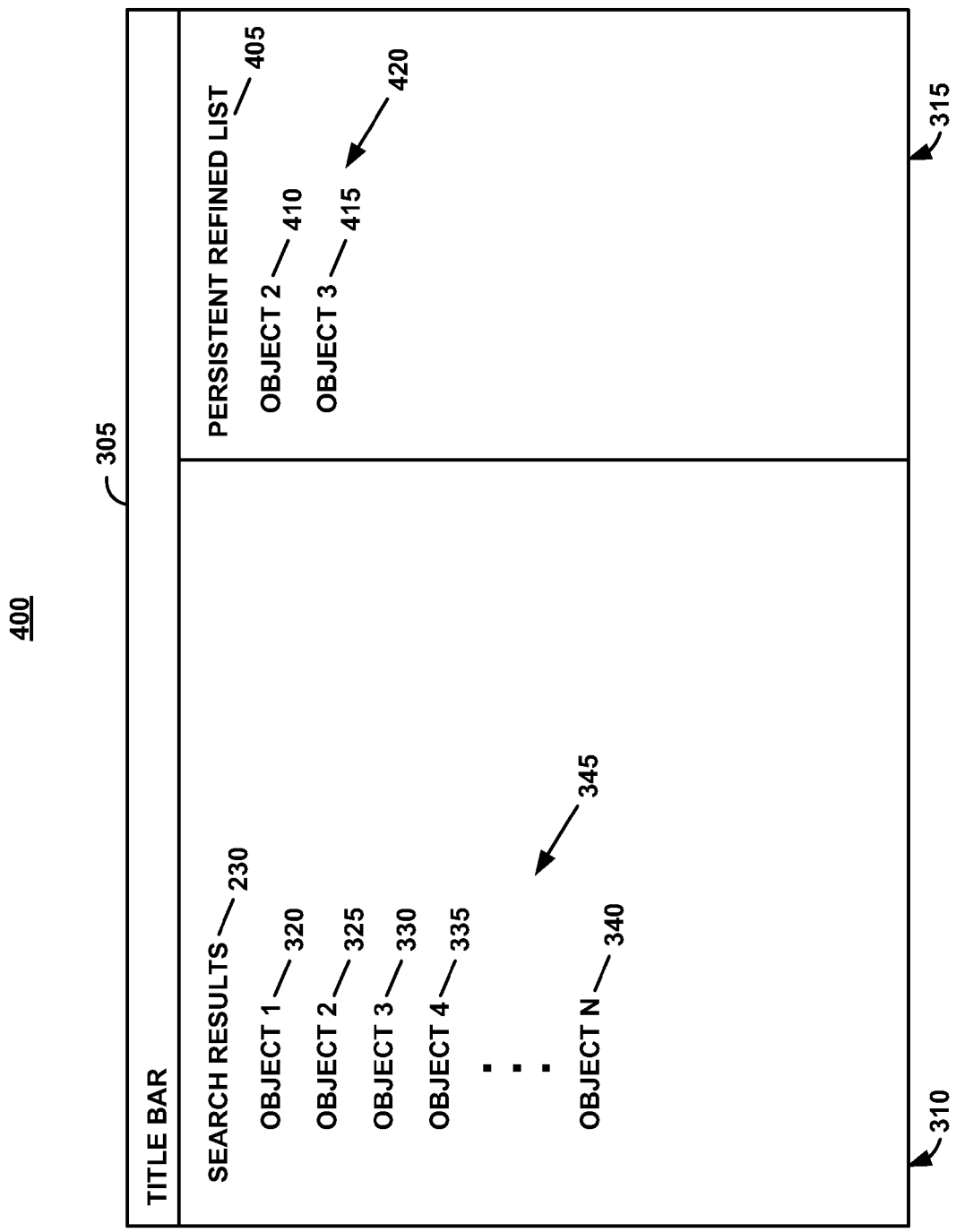
FIG. 4 is an exemplary screen shot of items selected from the search result of FIG. 3 and placed in a persistent bucket of the persistent filter refining system of FIGS. 1 and 2.

FIG. 4 shows a screen shot 400 that illustrates a user selecting objects from the objects 345 for placement in the persistent bucket 210 and display in a persistent refined list 405 of the persistent bucket display 315. The user selects, for example, object 2, 325, and object 3, 330. The transfer module 220 transfers the selected objects from the dynamic non-persistent bucket 205 to the persistent bucket module 225. The persistent bucket module 225 places the transferred objects in the persistent bucket 210. The persistent bucket module 225 displays the transferred objects in the persistent bucket display 315 as a persistent object 2, 410, and a persistent object 3, 415, collectively referenced as persistent objects

420. Persistent object 2, 410, is a copy of object 2, 325. Similarly, persistent object 3, 415, is a copy of object 3, 330. A scroll bar may be provided to allow access to objects in the persistent refined list 405 that are not visible in the persistent bucket display 315.

In one embodiment, the transfer module 220 moves the selected objects from the non-persistent bucket module 210 to the persistent bucket module 225. In this case, object 2, 325, and object 3, 330, are not displayed in the dynamic non-persistent bucket display 310 after selection by the user.

Figure 5:
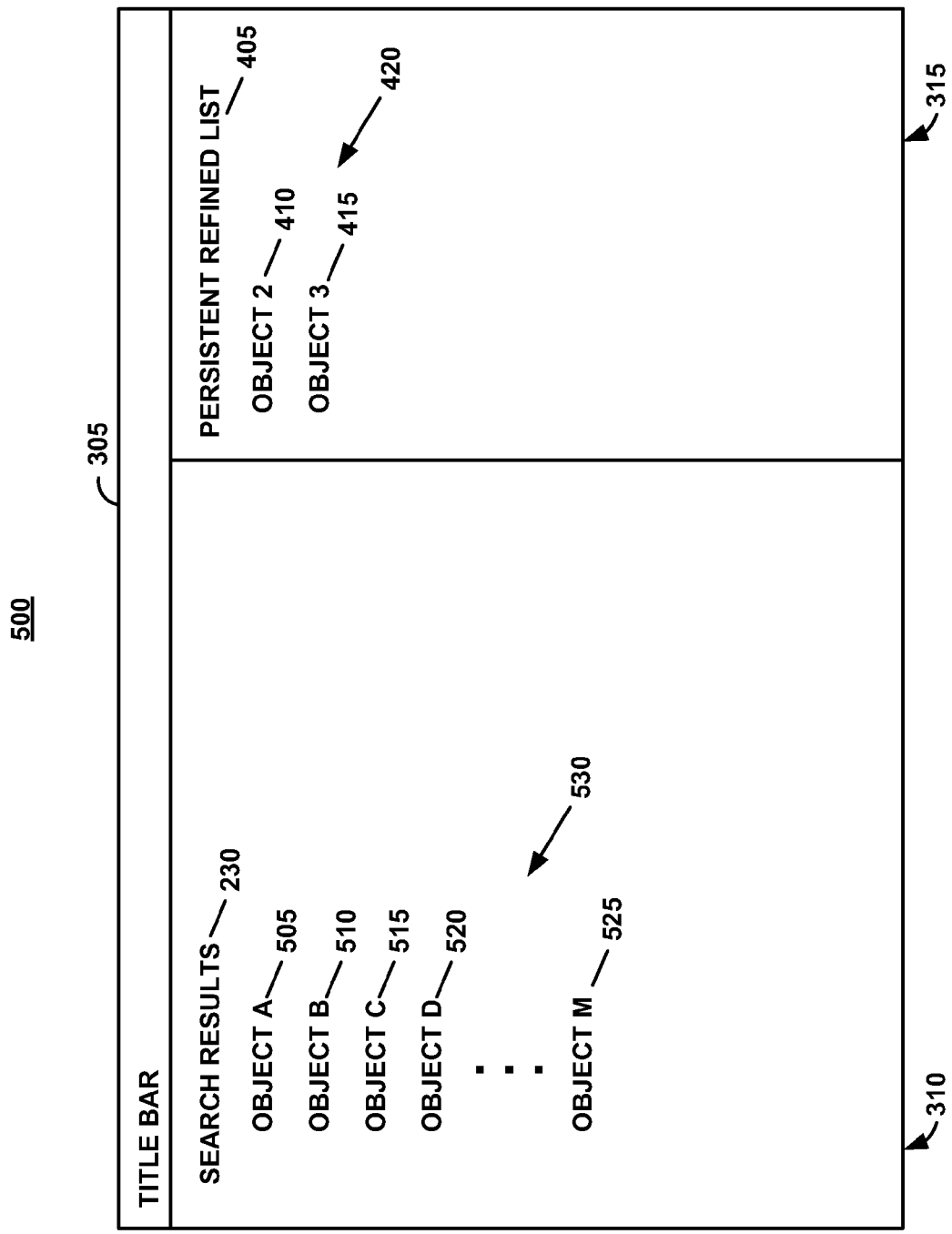
FIG. 5 is an exemplary screen shot of an additional search result returned to the persistent filter refining system of FIGS. 1 and 2 and placed in the dynamic non-persistent bucket.

FIG. 5 shows a screen shot 500 that illustrates results of an additional search displayed as search results 230 in the dynamic non-persistent bucket display 310. In this example, the persistent refined list 405 comprises persistent objects 420 that were previously selected. The search results 230 comprise an object A, 505, an object B, 510, an object C, 515, an object D, 520, through an object M, 525, collectively referenced as objects 530.

Figure 6:
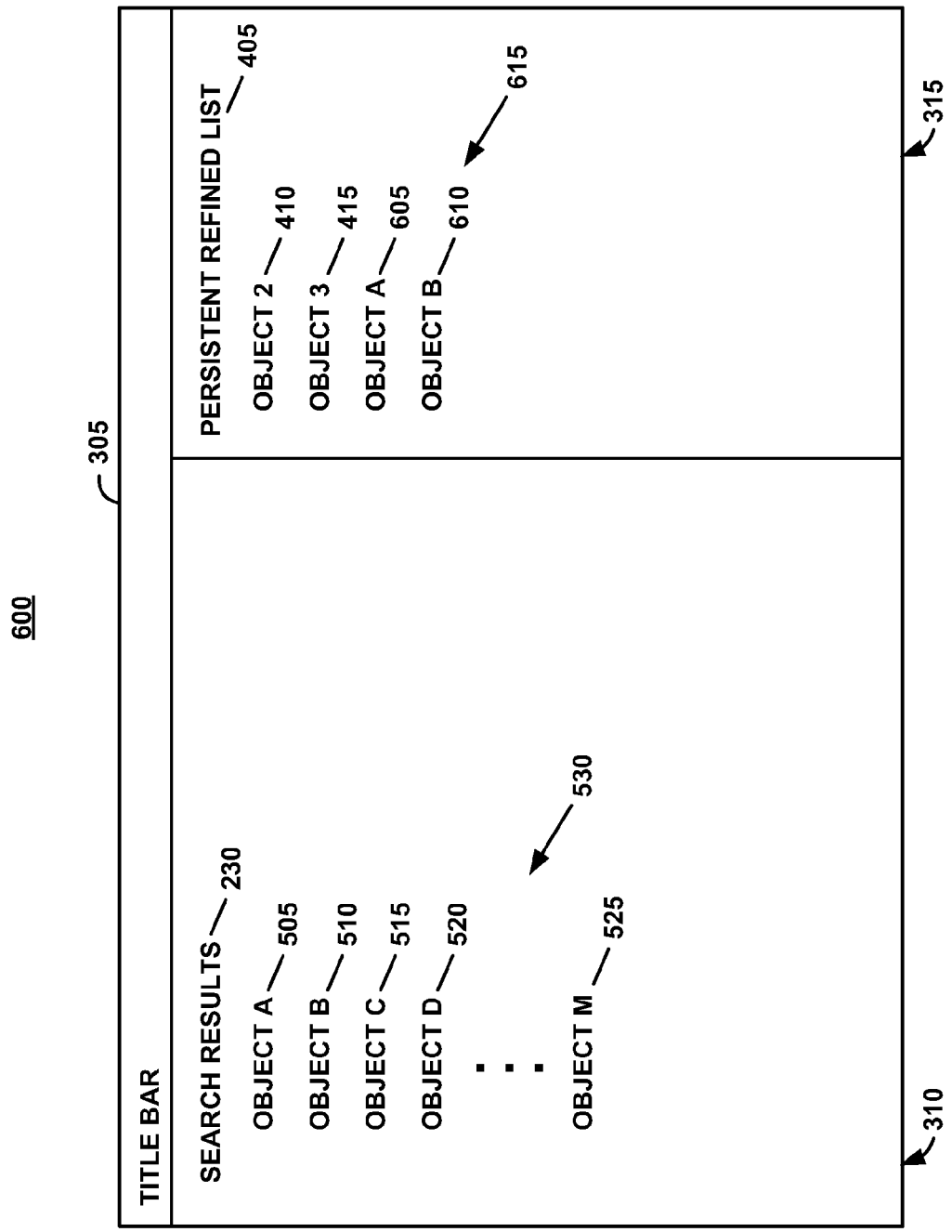
FIG. 6 is an exemplary screen shot of items selected from the search result of FIG. 5 and placed in a persistent bucket of the persistent filter refining system of FIGS. 1 and 2.

FIG. 6 shows a screen shot 600 that illustrates a user selecting objects from the objects 530 for display in the persistent refined list 405. The user selects, for example, object A, 505, and object B, 510. The transfer module 220 transfers the selected objects to the persistent bucket module 225. The persistent bucket module 225 places the transferred objects in the persistent bucket 210. The persistent bucket module 225 displays the transferred objects in the persistent bucket display 315 as a persistent object A, 605, and a persistent object B, 610. The persistent refined list 405 now comprises persistent object 2, 410, and persistent object 3, 415, that were selected from objects 345. The persistent refined list 405 further comprises persistent object A, 605, and persistent object B, 610, that were selected from objects 530. Persistent object 2, 410, persistent object 3, 415, persistent object A, 605, and persistent object B, 610, are collectively referenced as persistent objects 615. In this illustration, persistent object A, 605, is a copy of object A, 505. Similarly, persistent object B, 610, is a copy of object B, 510.

Figure 7:
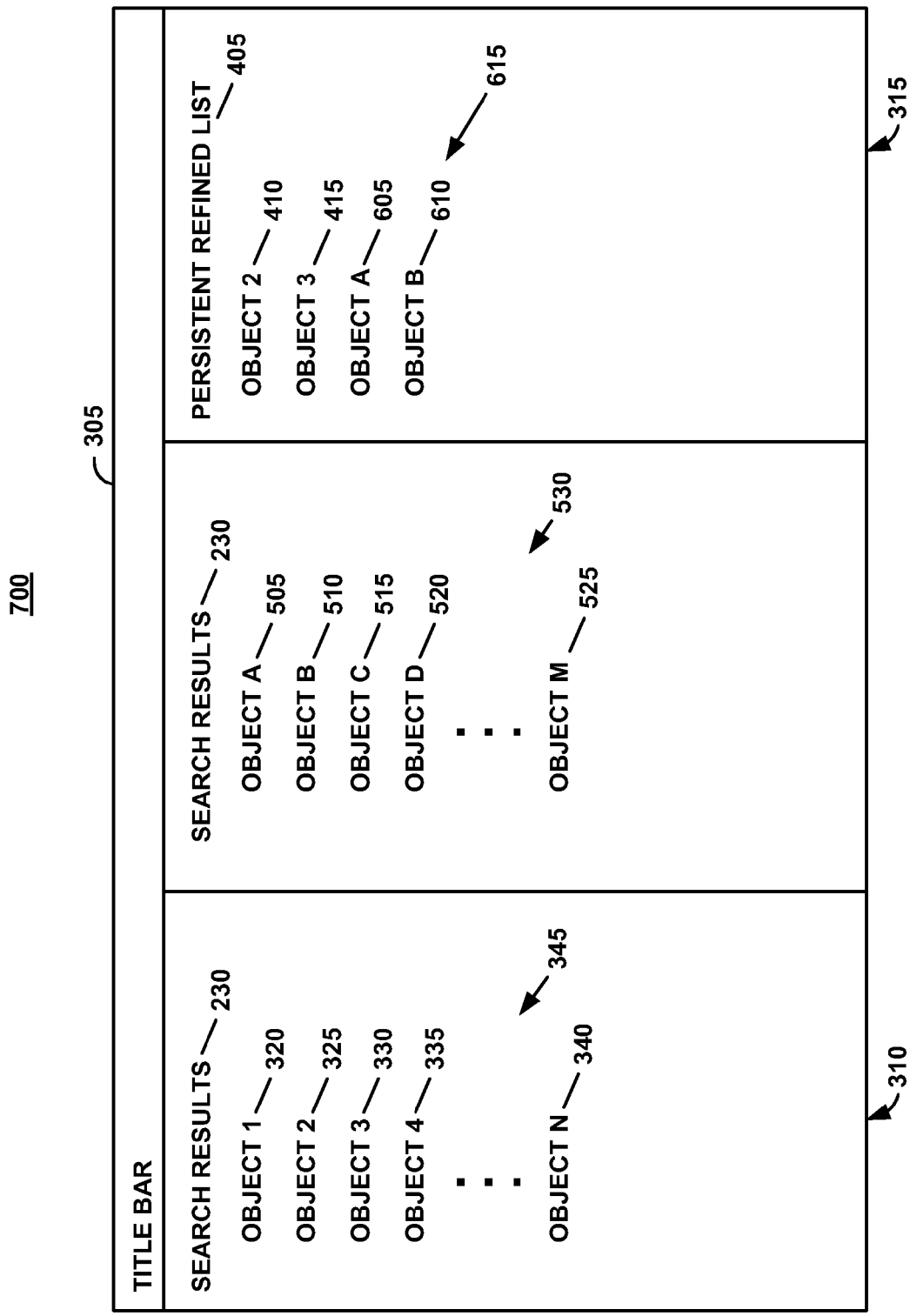
FIG. 7 is an exemplary screen shot illustrating search results displayed in the dynamic non-persistent bucket of FIGS. 1 and 2.

FIG. 7 shows a screen shot 700 that illustrates search results displayed in the dynamic non-persistent bucket display 310. For example, the dynamic non-persistent bucket module 215 displays search results 230 comprising objects 345, and search results 230 comprising objects 530. In one embodiment, when the user specifies multiple criteria from different sources (e.g., multiple internet sites), the search can be performed in parallel before the search results are displayed. The number of non-persistent buckets depends on the number of sources. There will always be one persistent bucket though. The user would then transfer the results from multiple parallel searches to the persistent list.

Using system 10, a user may, for example, wish to search for a product at one or more Internet retailers, but compare products found in more than one Internet retailer. Conventional search techniques allow a user to search in the inventory of one Internet retailer but not to select items from the inventory of one Internet retailer to compare with the inventory of another Internet retailer. Using system 10, the user may select an Internet retailer and search for laptop computers. The user may then select several laptop computers of interest from the search results. System 10 places the selected laptop computers in the persistent refined list 405 of the persistent bucket 210.

The user may then refine the search at the selected Internet retailer by, for example, limiting the search to laptop computers with a price less than $1000. The user may select one or more of the laptop computers from the search results. The selected laptop computers are appended to the persistent refined list 405. The user may then select another Internet retailer and search again for laptop computers, selecting several laptop computers. These selected laptop computers are appended to the persistent refined list 405. The persistent refined list 405 now comprises laptop computers selected from the initial search at the initial Internet retailer, laptop computers selected from a refined search at the initial Internet retailer, and laptop computers selected from a search at another Internet retailer. In this manner, the user can iteratively build a refined search result comprising only items of interest from one or more sources, enabling the user to easily compare items of interest.

System 10 can be used to gather search results from database tables in multiple databases 30, 35 and 40 as shown in FIG. 1. Instead of having to create one query with the exact search criteria which will return all the desired search results, the user can iteratively send queries to the databases and in each iteration select the desired search results. For example, the user wants to select all datasets with names from a table A in databases 30, 35 and 40 where the name starts with the letters "EMP". The user specifies the filter "Name starting with EMP" and all datasets with names starting with EMP are returned as search results to System 10. The user then selects one or more objects from the search results and System 10 places them in the persistent refined list 405 of the persistent bucket 210.

The user may also add datasets from the table A where schema has letters ADMIN. The user specifies the filter "Schema has letters ADMIN" and all datasets with schemas having ADMIN are returned as search results to system 10. The user may select one or more datasets with those schemas and system 10 appends those objects to the persistent refined list 405. The persistent refined list 405 now comprises datasets with names starting with the letters EMP from the first iteration of search and tables that are defined in schemas similar to ADMIN from the second iteration. By using the iterative search, the user can not only refine the search but also invoke a search with new search criteria without losing the desired search results from a previous iteration.

Figure 8:
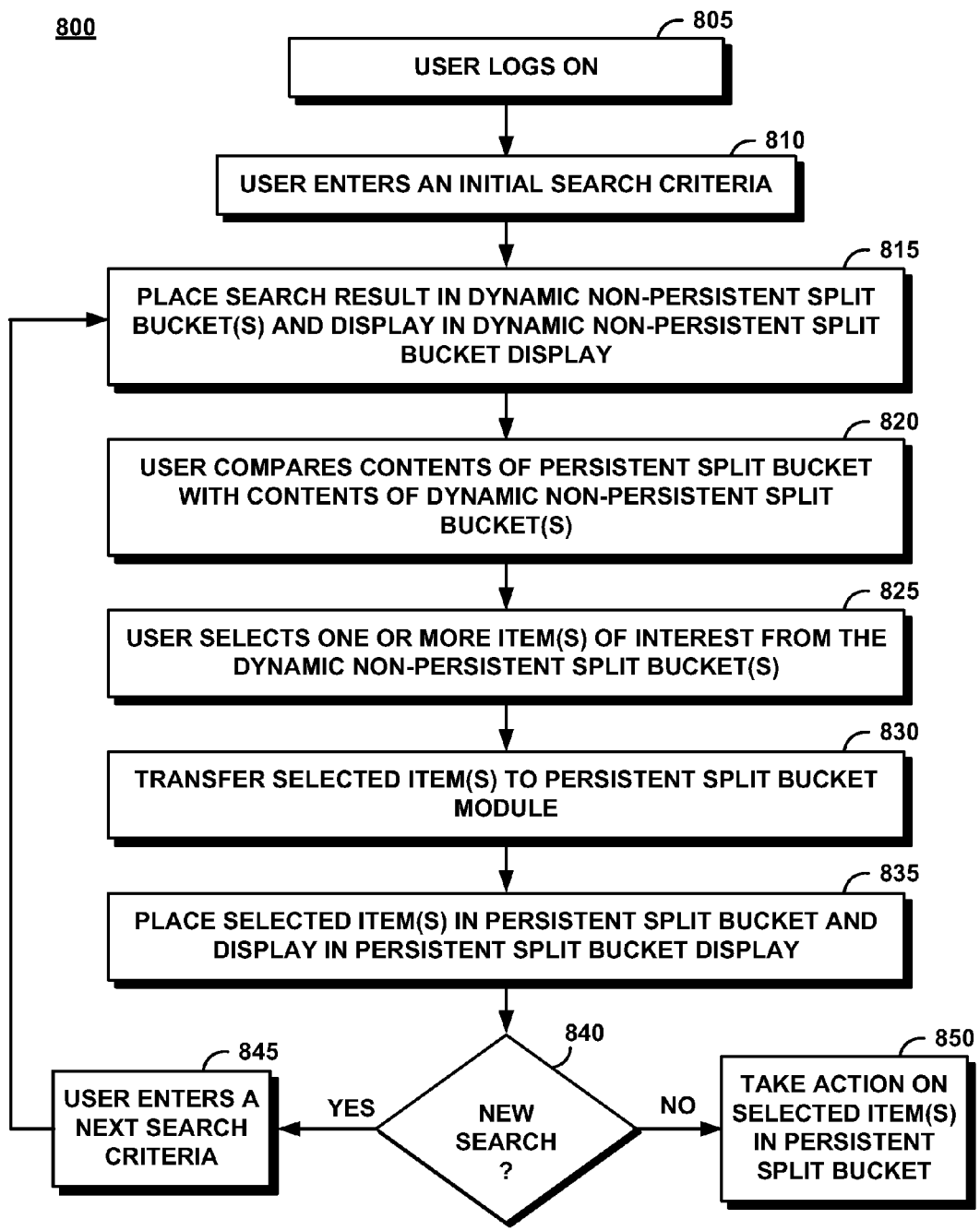
FIG. 8 is a process flow chart illustrating a method of operation of the persistent filter refining system of FIGS. 1 and 2.

FIG. 8 illustrates a method 800 of system 10. A user logs on to a search system comprising system 10 (step 805). The user enters an initial search criterion (step 810). The dynamic non-persistent bucket module 215 places the search results 230 in the dynamic non-persistent bucket 205 and displays the search results 230 in the dynamic non-persistent bucket display 310 (step 815). Additional search results 230 may also be placed in the dynamic non-persistent bucket 205 and displayed in the dynamic non-persistent bucket display 310.

The user compares contents of the persistent bucket 210 with the contents of the dynamic non-persistent bucket 205 (step 820). The user selects one or more item(s) of interest from the dynamic non-persistent bucket (step 825). The transfer module 220 transfers the selected items from the dynamic non-persistent spit bucket module 215 to the persistent bucket module 225 (step 830). The persistent bucket module 225 places the transferred items in the persistent bucket 210 and displays the transferred items in the persistent bucket display 315 (step 835).

If a new search is desired (decision step 840), the user enters a next search criteria (step 845) and processing returns to step 815. Steps 815 through 840 are performed iteratively, allowing the user to iteratively refine a search until a set of desired items is collected in the persistent bucket 210. The user may take action on the selected items in the persistent bucket 210 (step 850).

If the user wishes to remove an object from the persistent bucket 210, the user can select the objects from the displayed list. The transfer module 220 transfers the selected objects from the persistent bucket module 225 to the dynamic non-persistent bucket module 215. The dynamic non-persistent bucket module 215 determines if the transferred objects match the search criteria of the results for the current iteration displayed to the user in the dynamic non-persistent bucket 205. If the transferred objects are not displayed in the dynamic non-persistent bucket 205 because they were moved over to the dynamic non-persistent bucket module 215 and not copied to the persistent bucket 210, the dynamic non-persistent bucket module 215 places the transferred objects in the dynamic non-persistent bucket 205. If the objects were copied to the persistent bucket 210, the transferred objects will be discarded by the dynamic non-persistent bucket module 215. If the transferred objects do not match the search criteria of the current iteration displayed in the dynamic non-persistent bucket 205, the dynamic non-persistent bucket module 215 discards the transferred objects.

It is to be understood that the specific embodiments of the invention that have been described are merely illustrative of certain applications of the principle of the present invention. Numerous modifications may be made to the system and method for providing persistent refined intermediate results selected from dynamic iterative filtering described herein without departing from the spirit and scope of the present invention.

What is claimed is:

1. A computer-implemented method of providing persistent refined intermediate results selected from dynamic iterative filtering, comprising:
    in response to receiving search criteria for different sources, performing at least two searches in parallel for the different sources to generate at least two search results;
    for the different sources, simultaneously displaying the at least two search results in at least two dynamic non-persistent bucket displays;
    in response to user selection of objects from the at least two dynamic non-persistent bucket displays, transferring the selected objects from the at least two dynamic non-persistent bucket displays to a persistent bucket display, wherein there is one persistent bucket display for the at least two search requests; and
    displaying the transferred, selected objects in the persistent bucket display with the at least two non-persistent bucket displays.

2. The method of claim 1, wherein transferring the selected objects further comprises:
    providing a copy of each of the selected objects to the persistent bucket display.

3. The method of claim 1, wherein transferring the selected objects further comprises:
    removing each of the selected objects from the dynamic non-persistent bucket displays and placing each of the selected objects in the persistent bucket display.

4. A system for providing persistent refined intermediate results selected from dynamic iterative filtering, comprising:
    a processor:
    memory elements coupled to the processor, wherein the memory elements store computer code, and wherein, the processor is configured to execute the computer code to perform operations, wherein the operations comprise:
        in response to receiving search criteria for different sources, performing at least two searches in parallel for the different sources to generate at least two search results;
        for the different sources, simultaneously displaying the at least two search results in at least two dynamic non-persistent bucket displays;
        in response to user selection of objects from the at least two dynamic non-persistent bucket displays, transferring the selected objects from the at least two dynamic non-persistent bucket displays to a persistent bucket display, wherein there is one persistent bucket display for the at least two search requests; and
        displaying the transferred, selected objects in the persistent bucket display with the at least two non-persistent bucket displays.

5. The system of claim 4, wherein the the operations further comprise:
    providing a copy of each of the selected objects to the persistent bucket.

6. The system of claim 4, wherein the the operations further comprise:
    removing each of the selected objects from the dynamic non-persistent bucket displays and placing each of the selected objects in the persistent bucket display.

7. A computer program product having a plurality of executable instruction codes stored on a non-transitory computer useable storage medium, for providing persistent refined intermediate results selected from dynamic iterative filtering, comprising:
    a set of instruction codes for, in response to receiving search criteria for different sources, performing at least two searches in parallel for the different sources to generate at least two search results;
    a set of instruction codes for, for the different sources, simultaneously, displaying the at least two search results in at least two dynamic non-persistent bucket displays;
    a set of instructions codes for, in response to user selection of objects from the at least two dynamic non-persistent bucket displays, transferring the selected objects from the at least two dynamic non-persistent bucket displays to a persistent bucket display, wherein there is one persistent bucket display for the at least two search requests; and
    a set of instruction codes for displaying the transferred, selected objects in the persistent bucket display with the at least two non-persistent bucket displays.

8. The computer program product of claim 7, wherein the set of instruction codes for transferring the selected provides a copy of each of the selected objects to the persistent bucket.

9. The computer program product of claim 7, wherein the set of instruction codes for transferring the selected object removes each of the selected objects form the dynamic non-persistent bucket displays and places the selected objects in the persistent bucket display.

* * * * *